G. L. WEAVER.
JOURNAL BOX.

No. 82,665.

Patented Sept. 29, 1868.

Line of —— Section

Witnesses.
Thomas McManus
[signature]

Inventor
George L. Weaver

United States Patent Office.

GEORGE L. WEAVER, OF HARTFORD, CONNECTICUT.

Letters Patent No. 82,665, dated September 29, 1868.

---

IMPROVED JOURNAL-BOX.

---

*The Schedule referred to in these Letters Patent and making part of the same.*

---

TO ALL WHOM IT MAY CONCERN:

Be it known that I, GEORGE L. WEAVER, of Hartford, in the county of Hartford, in the State of Connecticut, have invented a new and useful Improvement in Anti-Friction Journal-Boxes; and I do declare that the following is a full and exact description thereof, reference being had to the accompanying drawings, and to the letters of reference marked thereon.

The nature of my invention consists in providing in journal-boxes a frame or casing for the reception of a number of round balls, of different sizes, and the arrangement of them in such manner as to diminish the friction very greatly if not altogether.

To enable others skilled in mechanics to make and use my invention, I will proceed to describe its construction and operation.

Figure 1:
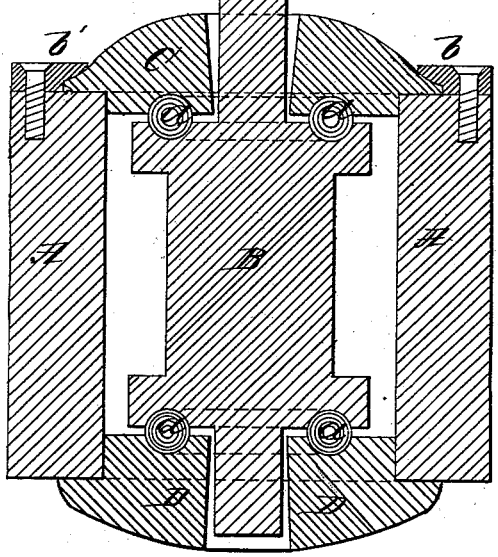
Figure 2:
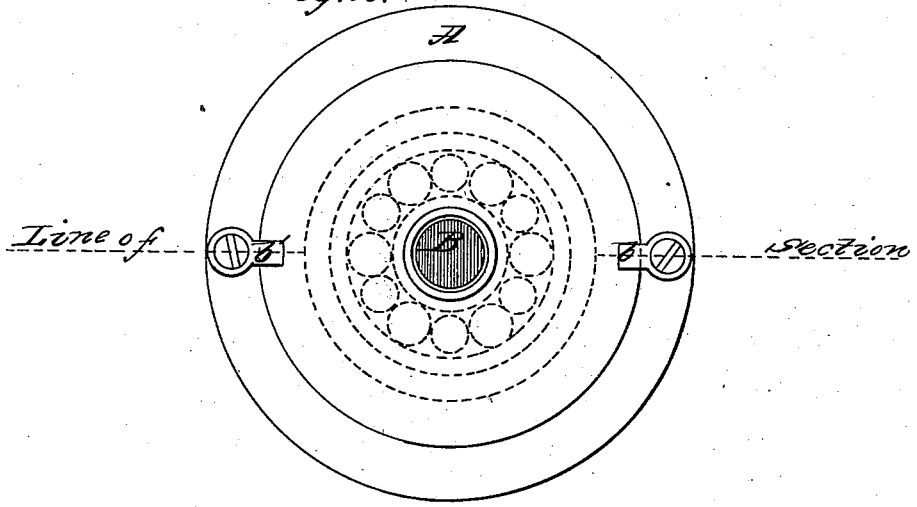

Figure 1 is a section, on line 1 and 2'.
Figure 2 is a plan.
The same letters of reference are alike in both figures.

A is the frame or casing, that receives the heads or ends C D. B is the shaft. $a\ a'\ a''\ a'''$ are round balls, made of any suitable material, and are placed in an annular recess in the heads C D, and in the ends of the enlarged part of the shaft B.

The balls referred to are sufficient in number to occupy the whole of the annular recess, and at the same time allow the balls to rotate, as the journal to which they may be attached rotates.

It will be seen that in fig. 2 the balls are shown in dotted lines, and are of two sizes, one a little smaller than the other, and placed alternately. The object of making them of two sizes is to insure a rotary motion of the balls as the shaft rotates, which would not be the case if all the balls were of the same size, as in that case one of them would retard the next, and so on around the entire circle.

By reference to the accompanying drawings, which are made part of this specification, the nature of the invention and the operation will be clearly seen.

It will be at once seen that whether the shaft be an upright or a horizontal shaft, the operation is the same, the balls receiving the weight and thrust of the shaft, and by being every other one smaller and larger, half of the balls only come in contact with the heads and enlarged part of the shaft B with any pressure, consequently the larger balls all rotate in one direction, and the smaller intermediate ones roll against the large ones, and keep them apart in their proper places, and are free to turn in the opposite direction, and not rub against but roll upon the large without friction.

I do not propose to confine myself to the precise form here shown, as the form may be varied, and still preserve all the characteristics of my invention.

What I claim as my invention, and desire to secure by Letters Patent, is—

The combination of the journal-box, having annular grooves in the heads C and D, and corresponding grooves on both ends of the shaft-bearings, B, with balls of two different sizes, placed alternately in the annular grooves, the whole arranged and operating as and for the purpose set forth.

GEORGE L. WEAVER.

Witnesses:
CHAS. Y. HEMPSTED,
THOMAS McMANUS.